United States Patent [19]
Van Pelt et al.

[11] Patent Number: 5,621,178
[45] Date of Patent: Apr. 15, 1997

[54] PIEZOELECTRIC SENSOR SYSTEM

[75] Inventors: Engerbert Van Pelt; Wouter Taen, both of Minato-ku, Japan

[73] Assignee: U.S. Philips Corporation, New York, N.Y.

[21] Appl. No.: 531,685

[22] Filed: Sep. 21, 1995

[30] Foreign Application Priority Data

Oct. 3, 1994 [JP] Japan .................................. 6-264675

[51] Int. Cl.$^6$ .................................................. G01L 1/00
[52] U.S. Cl. ............................ 73/862.61; 73/862.381
[58] Field of Search ........................... 73/862.61, 862.68, 73/862.581, 862.53, 701, 702, 717, 723, 753, DIG. 4; 310/325, 338; 340/665, 644; 324/420, 421, 423

[56] References Cited

U.S. PATENT DOCUMENTS

| | | | |
|---|---|---|---|
| 4,383,195 | 5/1983 | Kolm et al. | 310/332 |
| 4,538,087 | 8/1985 | Germano et al. | 310/332 |
| 4,625,137 | 11/1986 | Tomono | 310/332 |
| 4,658,154 | 4/1987 | Hernden et al. | 310/332 |
| 5,388,467 | 2/1995 | Jereb et al. | 73/862.381 |

*Primary Examiner*—Richard Chilcot
*Assistant Examiner*—Ronald Biegel
*Attorney, Agent, or Firm*—Edward Blocker

[57] ABSTRACT

A piezoelectric sensor system according to the invention employs a piezoelectric actuator relay (20) having a piezoelectric element displaceable in response to an actuation voltage and contacts (23, 24) which open or close in accordance with the displacement of the element, wherein the actuator relay (20) is adapted to receive a force (L) to be measured against the displacement. This piezoelectric actuator relay (20) is supplied, by a driver circuit (60), with a varying voltage as the actuation voltage. The relation between the forces (L) and the activation voltages necessary for opening or closing the contacts (23, 24) has been stored in a memory (70). A processor (50) obtains a value of the force (L) based on a value of the actuation voltage at the instant of the opening or closure of the contacts (23, 24) and the relation stored in the memory (70).

10 Claims, 5 Drawing Sheets

PIEZOELECTRIC SENSOR SYSTEM

BACKGROUND OF THE INVENTION

This invention relates to a piezoelectric sensor system for measuring the magnitude of a force exerted on an object.

There have been proposed various kinds of sensor devices for sensing a magnitude of force or a pressure. One example of such sensor devices is a piezoelectric transducer which converts a force exerted thereon into an electric signal such as a voltage. However, this type of piezoelectric transducer is sensitive only to relatively large forces and can not be used to measure small forces, for example, between 0 and 25 N (Newton). Another example of the conventional sensor devices is a semiconductor-type pressure sensor formed in an integrated circuit. However, such semiconductor-type pressure sensor is liable to be adversely affected by the surroundings such as the ambient temperature and can not therefore be used in an environment where the temperature is very high or where a corrosive gas exists.

SUMMARY OF THE INVENTION

It is therefore an object of the present invention to provide a piezoelectric sensor system having such a novel structure that small forces or low pressures can be measured at a high accuracy.

It is another object of the invention to provide such a piezoelectric sensor system which can be used in surroundings where the temperature varies over a wide range.

For achieving the above objects, a piezoelectric sensor system according to the present invention is characterized by comprising: a piezoelectric actuator relay having a piezoelectric element displaceable in response to an actuation voltage and contacts which open or close in accordance with the displacement of said element, said actuator relay being adapted to receive a force to be measured against said displacement;

a driver circuit for supplying said piezoelectric element with a varying voltage as said actuation voltage; and a measuring circuit responsive to an opening or a closure of said contacts for measuring a magnitude of said force based on a value of said actuation voltage at the instant of said opening or closure of said contacts.

In the piezoelectric sensor system having the above structure, actuation voltages necessary for closing or opening the contacts have a predetermined relation to forces which are to be measured and are applied to the piezoelectric element. Therefore, by measuring an actuation voltage at the instant of opening or closure of the contacts, a value of the force to be measured can be obtained based on the measured voltage and the above predetermined relation. In this case, the actuation voltages to be directly measured are relatively large values and the relation between the actuation voltages and the forces can distinctly be detected based on the opening and closure of the contacts, so that a range of relatively small forces can be used as an acceptable measuring range, whereby small forces can be measured very accurately. Since the piezoelectric actuator relay as a sensor portion is formed mainly from a piezoelectric material or the like and can be provided separately from the other portions of the system, it is possible to carry out a force measurement under hard conditions.

An example of the measuring circuit of the piezoelectric sensor system according to the invention may comprise:

an analog-to-digital converter for converting said actuation voltage into a digital value;

a memory for storing values of said actuation voltage at instants of the opening or closure of said contacts as a function of the magnitude of said force; and processor means for reading the digital value of said actuation voltage from said analog-to-digital converter when said contacts open or close and for determining the magnitude of said force with reference to the data stored in said memory.

With this structure, it is possible to construct the major part of the system in an integrated circuit.

An example of the piezoelectric actuator element in the piezoelectric sensor system according to the invention may comprise a pair of generally square plate-like piezoelectric elements connected to each other at four corners thereof in an opposed relation, said piezoelectric elements being provided with such electric contacts on the respective opposing surfaces thereof which are closed when said piezoelectric elements are not activated and open when said elements are activated. In this case, only one of the pair of plate-like piezoelectric elements may be driven by the actuation voltage.

A pressure sensing unit suitable for use in a pressure sensor system according to the invention may comprise:

a container having a first chamber for receiving a fluid whose pressure is to be measured and a second chamber which is gas-tightly separated from said first chamber by a diaphragm having a unit area surface and is in communication with the surroundings, said second chamber containing said piezoelectric actuator relay; and a pressure transmitting member supported within said second chamber for transmitting a pressure exerted on said diaphragm to said piezoelectric actuator relay.

With a pressure sensor unit having the above structure, it is possible to measure a pressure of a fluid such as a gas very easily and accurately.

BRIEF DESCRIPTION OF THE DRAWINGS

For a further understanding of the invention, reference is had to the following description taken in connection with the accompanying drawings, in which.

DETAILED DESCRIPTION OF THE PREFERRED EMBODIMENTS

Figure 1:
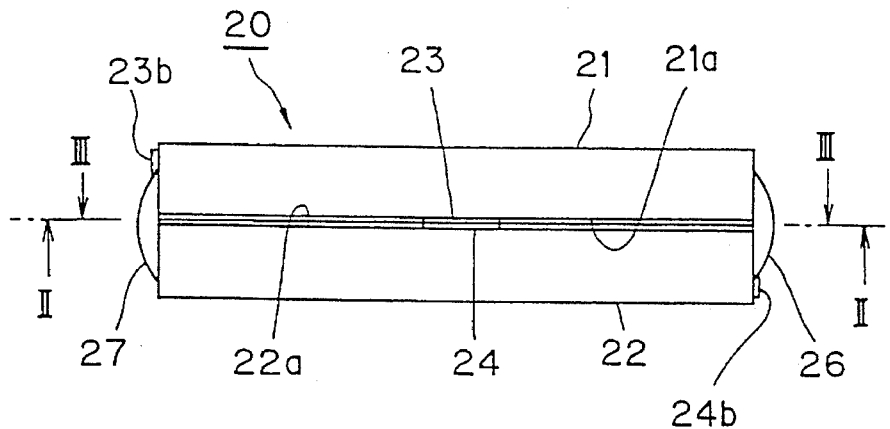
FIG. 1 is a side elevational view of a piezoelectric actuator relay for use in a piezoelectric sensor system according to the present invention.
Figure 2:
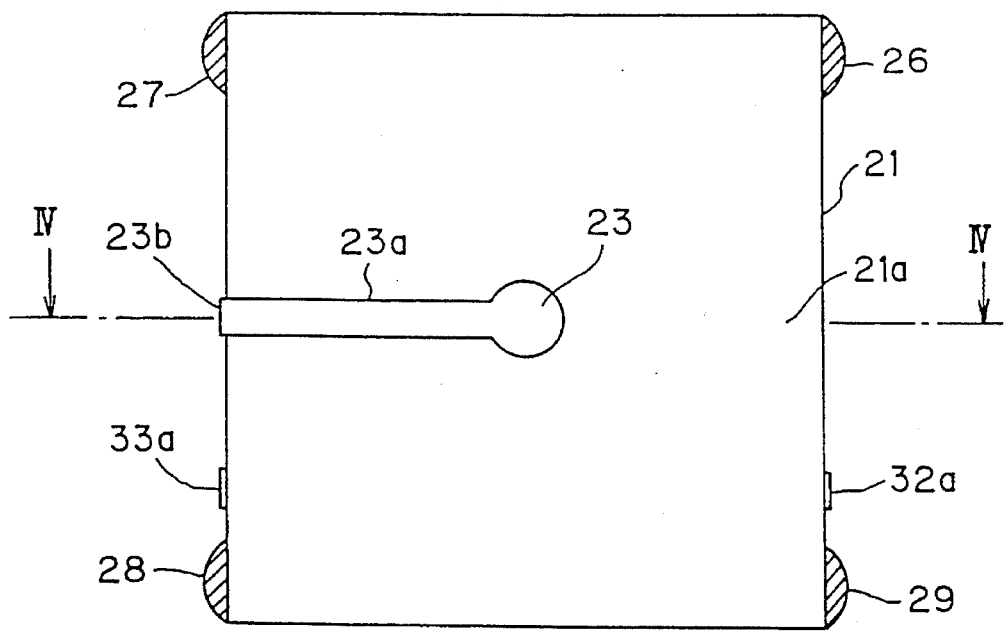
FIG. 2 is a cross-sectional view of the piezoelectric actuator relay of FIG. 1 taken along the line II—II.

First, an embodiment of a piezoelectric actuator relay used in a piezoelectric sensor system according to the present invention will be described with reference to FIGS. 1 to 8.

As shown in FIGS. 1 to 4, the piezoelectric actuator relay 20 is composed mainly of a pair of square plate-like piezoelectric actuator elements 21 and 22 disposed in an opposed relation and a pair of contacts 23 and 24 formed on respective opposing surfaces 21a and 22a of the actuator elements 21 and 22. The two actuator elements 21 and 22 are connected to each other at four corners of each element with connecting means 26 to 29 made, for example, of solder, epoxy resin or other glues. The centrally located contact 23 is electrically connected through a conductor track 23a formed on the surface 21a to a terminal 23b formed on a side face of the actuator element 21. Similarly, the other contact 24 is electrically connected through another conductor track 24a formed on the surface 22a to another terminal 24b which is formed on a side face of the actuator element 22. Thus, the terminals 23b and 24b for the two contacts 23 and 24 are located on the opposite side faces of the actuator relay 20.

Figure 4:
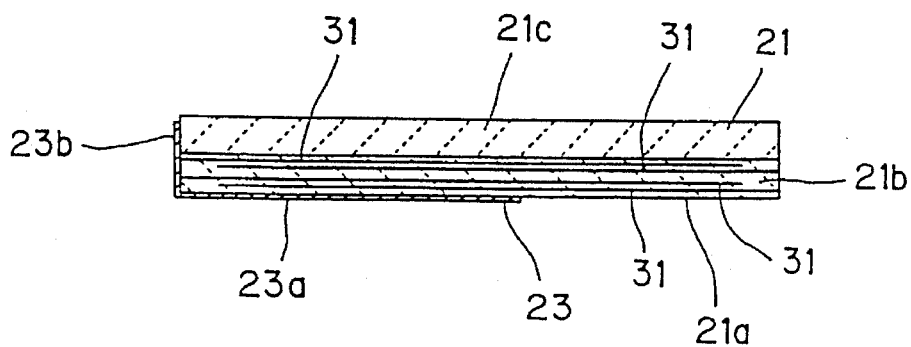
FIG. 4 is a cross-sectional view of the part of the piezoelectric actuator relay of FIG. 2 taken along the line IV—IV.
Figure 3:
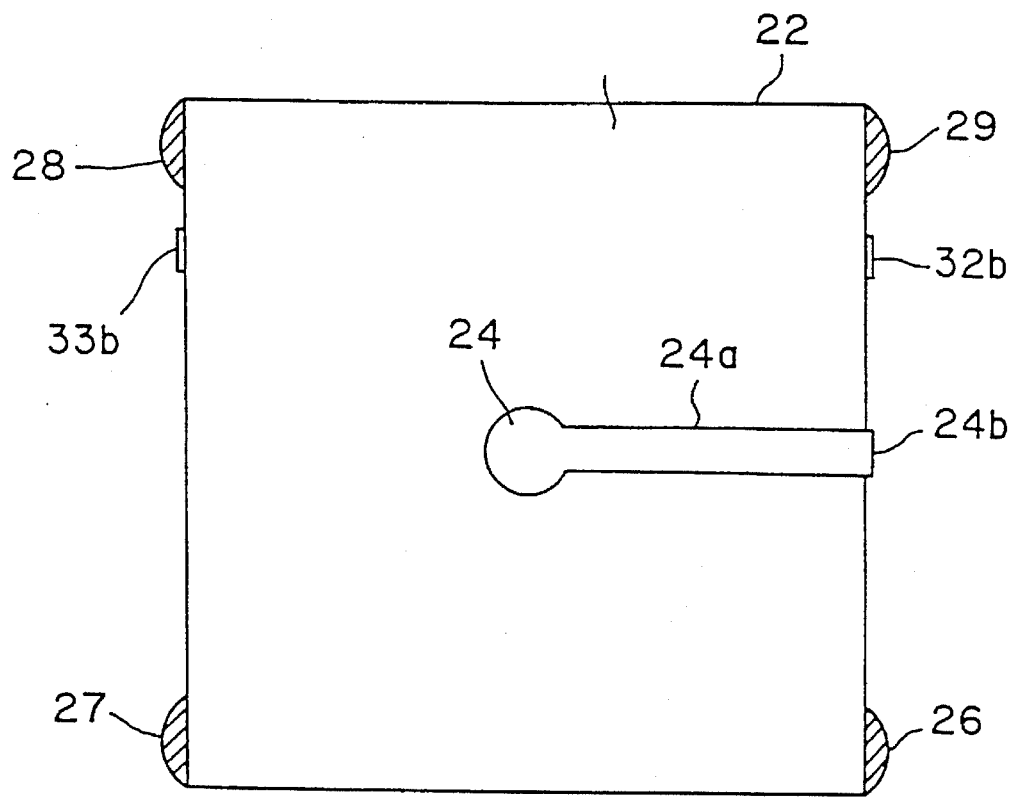
FIG. 3 is a cross-sectional view of the piezoelectric actuator relay of FIG. 1 taken along the line III—III.

As shown in FIG. 4, the actuator element 21 comprises two layer regions 21b and 21c lying one upon the other. The layer region 21b on the side of the surface 21a, which serves as an active layer region, has a multi-layer structure with a number of electrodes 31 (only four electrodes are shown in FIG. 4) each sandwiched between adjacent layers, each layer being made of a piezoelectric ceramic material. Odd-numbered ones of the electrodes 31 are connected to a terminal 32a (see FIG. 2) provided on a side face of the actuator element 21 and even-numbered ones of the electrodes 31 are connected to another terminal 33a provided on the opposite side face of the element 21. The layer region 21c is also made of a piezoelectric ceramic material and has a multi-layer structure but has no electrodes, thus this layer region serving as a non-active layer region. Similarly, the actuator element 22 has an active layer region on the side of the surface 22a and a non-active layer region on the other side. Electrodes in the active layer region of the element 22 are connected to terminals 32b and 33b in a manner described above for the actuator element 21.

Figure 5:
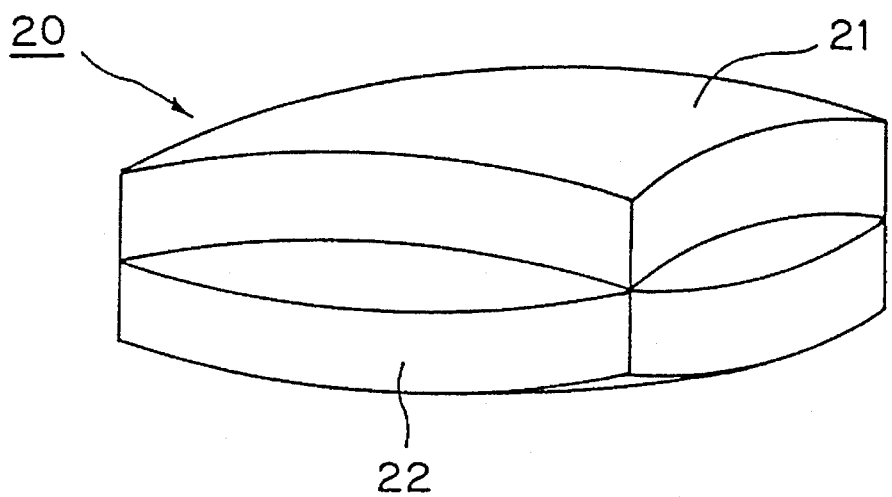
FIG. 5 is a perspective view of the piezoelectric actuator relay of FIG. 1 in the activated state.

With the above structure, when no actuation voltage is applied to the actuator relay 20, the elements 21 and 22 are flat, so that the contacts 23 and 24 are closed (see FIG. 1). When an actuation voltage is applied across the terminals 32a, 32b and 33a, 33b, however, the active layer regions of the actuator elements 21 and 22 radially contract, whereas the non-active layer regions remain as they are. As a result, each actuator element 21, 22 of the actuator relay 20 deforms into a spherical section as shown in FIG. 5, so that the center portions of the respective actuator elements 21 and 22 move away from each other whereby the contacts 23 and 24 open.

Figure 6:
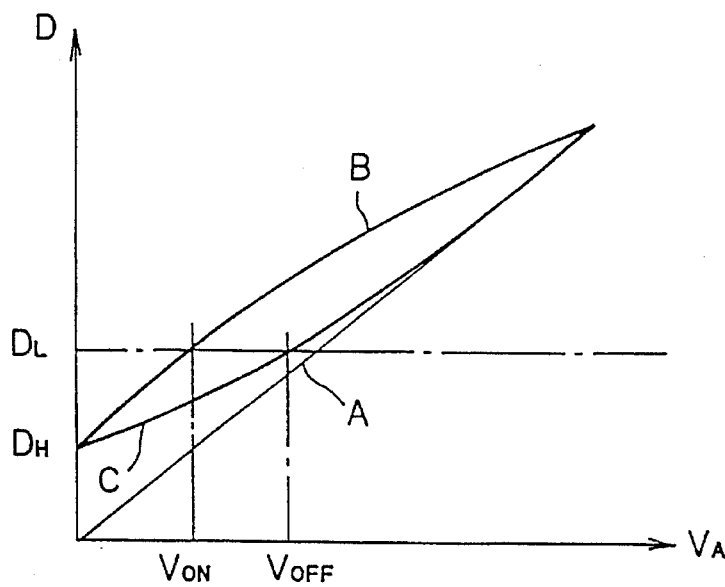
FIG. 6 is a graph showing the relation of the activation voltage and the displacement of the piezoelectric actuator relay of FIG. 1.

FIG. 6 shows the amount of relative displacement D of the two actuator elements 21 and 22 at the centers thereof as a function of the actuation voltage $V_A$ applied to the actuator relay 20. When the voltage $V_A$ is increased from zero, the displacement D increases substantially linearly as indicated by a line A. When the displacement D exceeds a certain minimum level $D_L$ the contacts 23 and 24 open. When the actuation voltage $V_A$ is decreased, the displacement D decreases along a curve B due to the hysteresis characteristics of the piezoelectric material of the actuator elements 21 and 22. When the displacement D reaches the value $D_L$ at the actuation voltage $V_A$ equal to VON the contacts 23 and 24 are closed. When the actuation voltage $V_A$ returns to zero, a certain amount of displacement $D_H$ still exists due to the hysteresis characteristics. When the actuation voltage $V_A$ is again increased, the displacement D increases along a different curve C and when the voltage $V_A$ reaches a value $V_{OFF}$ the contacts open.

Figure 7:
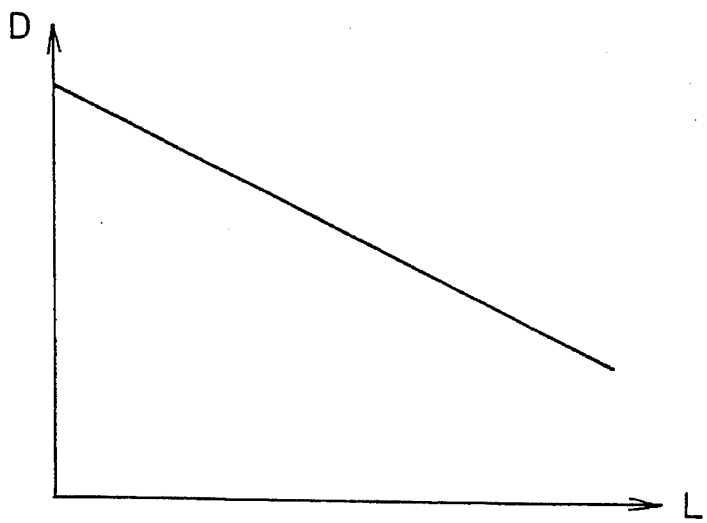
FIG. 7 is a graph showing the relation between the displacement and the load of the piezoelectric actuator relay of FIG. 1.
Figure 8:
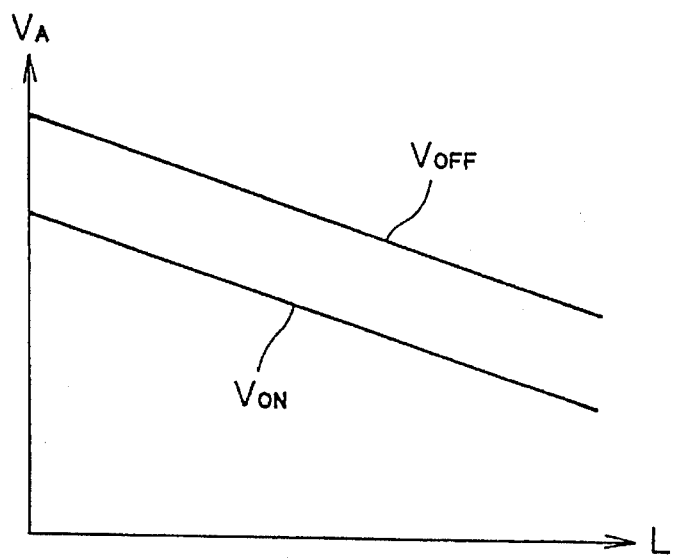
FIG. 8 is a graph showing the relation between the actuation voltages at the opening and closure of the contacts and the load of the piezoelectric actuator relay of FIG. 1.

When a pressing force or a load is applied across the centers of the two actuator elements 21 and 22, the displacement D is decreased against the force exerted therein by the actuation voltage $V_A$ by an amount dependent on the magnitude of the load. FIG. 7 shows an exemplary variation of the displacement D as a function of the load L with the actuation voltage $V_A$ being kept constant. From the showing of FIG. 7 it will be appreciated that when a load is applied to the actuator relay 20 the voltage $V_A$ necessary to open (or close) the contacts 23 and 24, i.e., the voltage VON or $V_{OFF}$, is determined in dependence on the magnitude of the load L. FIG. 8 plots the voltages $V_{ON}$ and $V_{OFF}$ as a function of the load L.

From the foregoing, it will be understood that by measuring the voltage VON or $V_{OFF}$ or both voltages the value of the load L will be known.

An embodiment of the piezoelectric sensor system according to the present invention will now be described with reference to FIG. 9.

This piezoelectric sensor system 10 comprises a piezoelectric actuator relay 20 of the type described above with reference to FIGS. 1 to 4. Contacts 23 and 24 of this actuator relay are connected to control input terminals 40a and 40b of an analog-to-digital (A/D) converter 40 whose input terminals 40c and 40d are connected to actuation terminals 32 and 33 of the actuator relay 20. The A/D converter 40 is of the type which converts a voltage across the input terminals 40c and 40d into a digital value at the instant when the control input terminals 40a and 40b are electrically connected (or when these two terminals are electrically isolated). This type of A/D converter can easily be constructed, for example, by a commercially available A/D converter or a combination of a commercially available A/D converter and an analog or a digital sample-and-hold circuit. The digital value obtained at this A/D converter 40 is fed to a processor 50 such as a micro-processor.

The processor 50 is also connected to a driver circuit 60 for the actuator relay 20. This driver circuit is constituted, for example, by a waveform generator for generating a voltage signal having a (single or repetitive) triangular waveform and a power amplifier. The amplified voltage signal is applied as the actuation voltage $V_A$ across the terminals 32 and 33 of the actuator relay 20. The voltage $V_A$ is also supplied to the input terminals of the A/D converter 40.

The processor 50 is further connected to a memory 70. This memory is constituted preferably by a ROM in which values representative of the voltages $V_{ON}$ (or $V_{OFF}$ or both of $V_{ON}$ and $V_{OFF}$) of the actuator relay 20 have been stored as a function of the load L in the form of a data table.

The operation of the system of FIG. 9 will now be described. First, the processor 50 supplies a trigger signal to the driver circuit 60, which in response thereto generates a voltage $V_A$ having a triangular waveform, so that the actuator relay 20 is driven first by the increasing voltage $V_A$. When the voltage $V_A$ reaches a certain value corresponding to the load L, the contacts 23 and 24 open, whereupon the A/D converter 40 converts the magnitude of voltage $V_A$ at that instant into a digital value. This digital value is received by the processor 50, which in turn refers to the data table in the memory 70 and reads therefrom the value of load L corresponding to the received digital value. The thus obtained load value L can be supplied to an external device such as a display.

Figure 10:
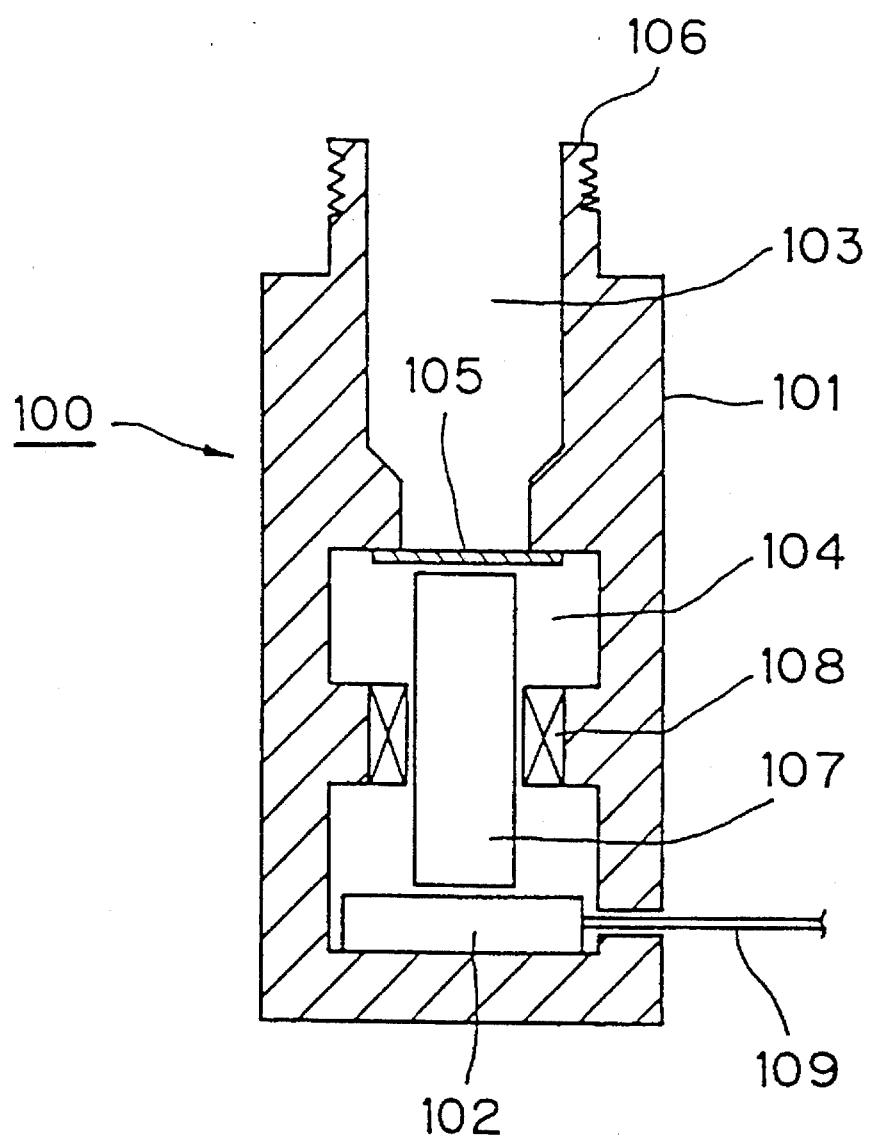
FIG. 10 is a cross-sectional view of an embodiment of a pressure sensing unit for use in a piezoelectric sensor system according to the present invention.

FIG. 10 shows a specifically designed sensing unit for the present sensor system which is suitable for measuring a pressure of a fluid such as a gas. This sensing unit, generally designated by a reference numeral 100, comprises a bottle-like container 101 made for example of a metal, on a bottom of which a piezoelectric actuator relay 102 identical in structure to the actuator relay 20 of FIGS. 1 to 4 is placed. This container 101 has first and second chambers 103 and 104 which are gas-tightly separated by a diaphragm 105 having a unit surface area. The first chamber 103 is for the application of a pressure to be measured, and for that purpose a neck portion 106 of the container 101 has a threaded outer periphery for piping. The second chamber 104 is in communication with the surroundings and contains therein the actuator relay 102, as mentioned before, and a rod 107 supported by a bearing 108 for transmitting the pressure applied to the diaphragm 105 to the actuator relay 102. Signal wires 109 of the actuator relay 102 are drawn out of the container 101 through an aperture formed in a wall of the container 101.

When the above sensing unit 100 is connected through a pipe to a chamber under pressure, the pressure is transmitted through a deformation of the diaphragm 105 and a movement of the rod 107 to the actuator relay 102. The pressure thus applied to the actuator relay 102 is measured by a circuit (not shown in FIG. 10) equivalent to the circuit shown in FIG. 9.

In the above embodiments, the actuator relay 20 comprises a pair of piezoelectric actuator elements 21 and 22 both of which can be activated. However, the actuator relay can be modified so that only one of the two actuator elements is activated. In that case, the non-activated element may be replaced by a planer substrate on which other circuit components are mounted in addition to one of the contacts of the relay. Also, the actuator element is not only of the square shape but also of any other shape such as a disc or a rectangle. Where an actuator element of the rectangular shape is used, it can be mounted on a substrate by connecting its one end to the substrate with one of the contacts being provided at the other end. In that case, the other contact is provided on the substrate and the actuator element is so arranged that the other end thereof moves away from the substrate when the element is activated. Also, the piezoelectric actuator element may be formed not only with the multi-layer structure but also with other known structure. Thus, any type of piezoelectric actuator relay can be used in this invention as long as it has at least a pair of contacts which are made open or closed by a piezoelectric element.

Figure 9:
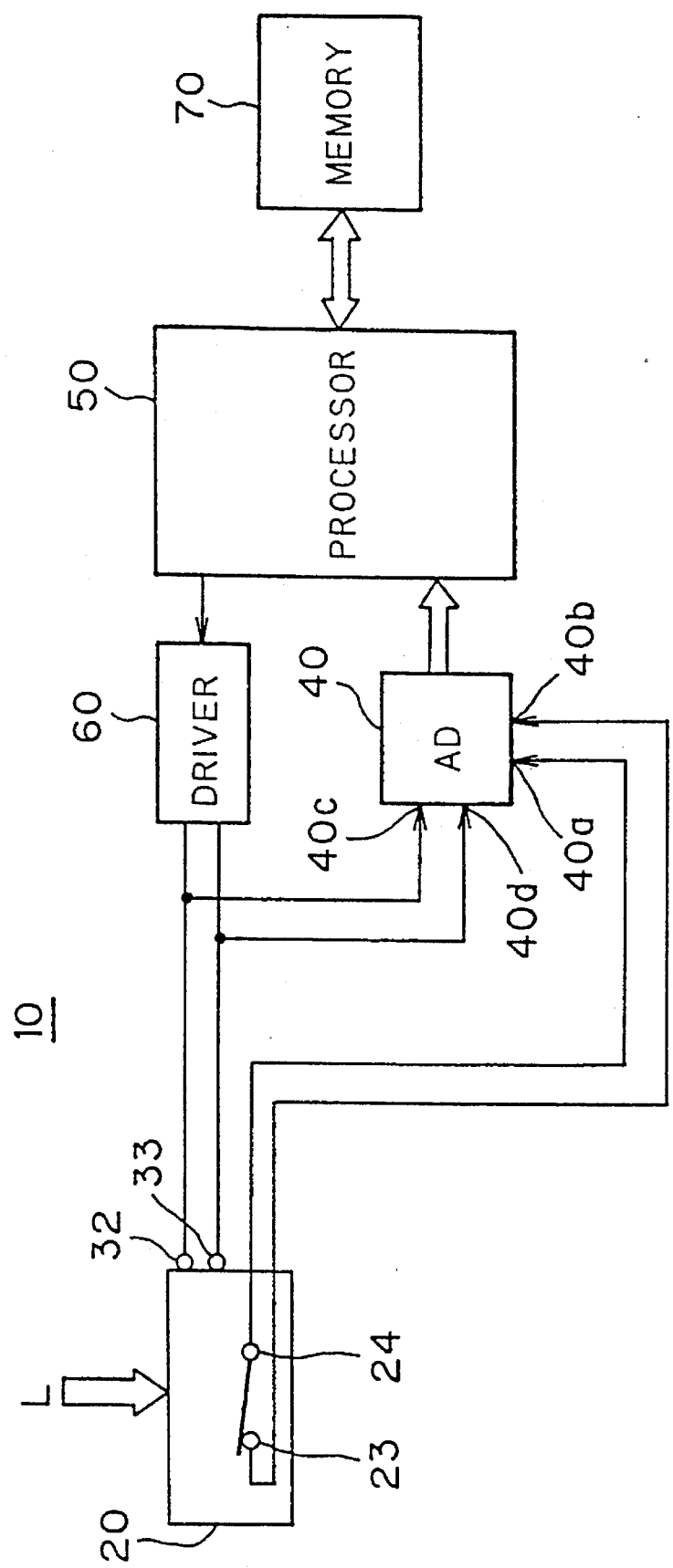
FIG. 9 is a block diagram of an embodiment of the piezoelectric sensor system according to the present invention wherein the piezoelectric actuator relay of FIG. 1 is used.

With the structure of the sensor system of FIG. 9, by suitably designing the piezoelectric actuator relay 20 the actuation voltage $V_A$ in the range of 5 to 10 volts can be used for the measurement of forces in the range of 0 to 10 N. In that case, all the circuit elements 40, 50, 60 and 70 can be formed within a single IC chip.

The varying activation voltage $V_A$ to be applied to the actuator relay 20 for the measurement of a force may preferably have a triangular shape, but the voltage $V_A$ may take other waveforms such as a saw-tooth waveform. The voltage $V_A$ may preferably be applied to the relay 20 repetitively so that the force can be measured more accurately by averaging the values obtained in the respective cycles.

In the embodiment described above with reference to FIG. 9, the processor 50 obtains the value of load L with reference to a data table stored in the memory 70. However, the processor 50 can also obtain the value of load L by means of calculation based on a suitably programmed formula.

We claim:

1. A piezoelectric sensor system for measuring a magnitude of a force exerted on an object comprising:

a piezoelectric actuator relay having a piezoelectric element displaceable in response to an actuation voltage and contacts which open or close in accordance with the displacement of said element, said actuator relay being adapted to receive said force to be measured against said displacement;

a driver circuit for supplying said piezoelectric element with a varying voltage as said actuation voltage; and a measuring circuit responsive to an opening or a closure of said contacts for measuring a magnitude of said force based on a value of said actuation voltage at the instant of said opening or closure of said contacts.

2. A piezoelectric sensor system according to claim 1, wherein said measuring circuit comprises:

an analog-to-digital converter for converting said actuation voltage into a digital value;

a memory for storing values of said actuation voltage at instants of the opening or closure of said contacts as a function of the magnitude of said force; and processor means for reading the digital value of said actuation voltage from said analog-to-digital converter when said contacts open or close and for determining the magnitude of said force with reference to the data stored in said memory.

3. A piezoelectric sensor system according to claim 1, wherein said piezoelectric actuator relay comprises a pair of generally square plate-like piezoelectric elements connected to each other at four corners thereof in an opposed relation, said piezoelectric elements being provided with such electric contacts on the respective opposing surfaces thereof which are closed when said piezoelectric elements are not activated and open when said elements are activated.

4. A piezoelectric sensor system according to claim 3, wherein only one of said pair of piezoelectric elements is activatable.

5. A pressure sensing unit for use in a piezoelectric sensor system as claimed in claim 1 comprising:

a container having a first chamber for receiving a fluid whose pressure is to be measured and a second chamber which is gas-tightly separated from said first chamber by a diaphragm having a unit area surface and is in communication with the surroundings, said second chamber containing said piezoelectric actuator relay; and a pressure transmitting member supported within said second chamber for transmitting a pressure exerted on said diaphragm to said piezoelectric actuator relay.

6. A piezoelectric sensor system according to claim 2, wherein said piezoelectric actuator relay comprises a pair of generally square plate-like piezoelectric elements connected to each other at four corners thereof in an opposed relation, said piezoelectric elements being provided with such electric contacts on the respective opposing surfaces thereof which are closed when said piezoelectric elements are not activated and open when said elements are activated.

7. A pressure sensing unit for use in a piezoelectric sensor system as claimed in claim 2 comprising:

a container having a first chamber for receiving a fluid whose pressure is to be measured and a second chamber which is gas-tightly separated from said first chamber by a diaphragm having a unit area surface and is in communication with the surroundings, said second chamber containing said piezoelectric actuator relay; and a pressure transmitting member supported within said second chamber for transmitting a pressure exerted on said diaphragm to said piezoelectric actuator relay.

8. A pressure sensing unit for use in a piezoelectric sensor system as claimed in claim 3 comprising:

a container having a first chamber for receiving a fluid whose pressure is to be measured and a second chamber which is gas-tightly separated from said first chamber by a diaphragm having a unit area surface and is in communication with the surroundings, said second chamber containing said piezoelectric actuator relay; and a pressure transmitting member supported within said second chamber for transmitting a pressure exerted on said diaphragm to said piezoelectric actuator relay.

9. A pressure sensing unit for use in a piezoelectric sensor system as claimed in claim 4 comprising:

a container having a first chamber for receiving a fluid whose pressure is to be measured and a second chamber which is gas-tightly separated from said first chamber by a diaphragm having a unit area surface and is in communication with the surroundings, said second chamber containing said piezoelectric actuator relay; and a pressure transmitting member supported within said second chamber for transmitting a pressure exerted on said diaphragm to said piezoelectric actuator relay.

10. A pressure sensing unit for use in a piezoelectric sensor system as claimed in claim 6 comprising:

a container having a first chamber for receiving a fluid whose pressure is to be measured and a second chamber which is gas-tightly separated from said first chamber by a diaphragm having a unit area surface and is in communication with the surroundings, said second chamber containing said piezoelectric actuator relay; and a pressure transmitting member supported within said second chamber for transmitting a pressure exerted on said diaphragm to said piezoelectric actuator relay.

\* \* \* \* \*